(12) United States Patent
Kimura

(10) Patent No.: US 9,046,152 B2
(45) Date of Patent: Jun. 2, 2015

(54) CHAIN CONNECTION LINK

(71) Applicant: KITO CORPORATION

(72) Inventor: Satoru Kimura, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 0 days.

(21) Appl. No.: 14/361,473

(22) PCT Filed: Nov. 28, 2012

(86) PCT No.: PCT/JP2012/080752
§ 371 (c)(1),
(2) Date: May 29, 2014

(87) PCT Pub. No.: WO2013/081009
PCT Pub. Date: Jun. 6, 2013

(65) Prior Publication Data
US 2014/0325955 A1 Nov. 6, 2014

(30) Foreign Application Priority Data
Nov. 30, 2011 (JP) .................................. 2011-261460

(51) Int. Cl.
| F16G 15/04 | (2006.01) |
| F16G 15/12 | (2006.01) |
| F16G 13/14 | (2006.01) |
| F16G 13/12 | (2006.01) |

(52) U.S. Cl.
CPC ................ *F16G 15/12* (2013.01); *F16G 13/14* (2013.01); *F16G 13/12* (2013.01); *F16G 15/04* (2013.01)

(58) Field of Classification Search
CPC ........... F16G 1/24; F16G 13/12; F16G 13/14; F16G 15/04; F16G 15/12
USPC .......................... 59/78, 84, 85, 86, 87, 88, 89
See application file for complete search history.

(56) References Cited

U.S. PATENT DOCUMENTS

| 1,513,729 | A | * | 11/1924 | Adams | ............................... | 59/85 |
| 2,777,284 | A | * | 1/1957 | Page | ................................. | 59/85 |
| 3,828,550 | A | * | 8/1974 | Fink | .................................. | 59/85 |
| 4,525,994 | A | * | 7/1985 | Alt et al. | ............................ | 59/85 |

FOREIGN PATENT DOCUMENTS

| GB | 1 305 945 | 2/1973 |
| GB | 2 448 315 A | 10/2008 |
| JP | 11-325193 | 11/1999 |

OTHER PUBLICATIONS

International Search Report issued Feb. 5, 2013 in corresponding International Application No. PCT/JP2012/080752.

* cited by examiner

*Primary Examiner* — David B Jones
(74) *Attorney, Agent, or Firm* — Wenderoth, Lind & Ponack, L.L.P.

(57) ABSTRACT

A chain connection link includes: a pair of U-shaped links of a U-shaped configuration in front view and each having two arms; a connection arm portion provided at an end portion of one arm of each of these U-shaped links; a connection groove-shaped arm portion having a groove and provided at an end portion of the other arm of each of these U-shaped links; and through-holes provided in the connection arm portion and the connection groove-shaped arm portion, the connection arm portion of one U-shaped link being fit-engaged with the connection groove-shaped arm portion of the other U-shaped link, a connection shaft being passed through the through-holes to connect the pair of U-shaped links, wherein the size of the outer periphery of the connection groove-shaped arm portion is larger than the size of the outer periphery of the connection arm portion.

2 Claims, 7 Drawing Sheets

CHAIN CONNECTION LINK

TECHNICAL FIELD

The present invention relates to a chain connection link used when connecting a chain to a hanging metal member such as a hook in a chain sling or the like, and when connecting chains to each other.

BACKGROUND ART

Conventionally, as a chain connection link connecting a chain or the like formed by connecting together elliptical annular links, there has been known a chain connection link in which a connection arm portion and a connection groove-shaped arm portion are respectively provided at one and the other of both arms of each of a pair of U-shaped links (PTL 1 and PTL 2). In this chain connection link, the connection arm portion of one U-shaped link is fitted into the groove portion of the connection groove-shaped arm portion of the other U-shaped link, and a connection shaft is inserted into through-holes provided in both arm portions, whereby the pair of U-shaped links are connected together in an annular form.

More specifically, in the chain connection link disclosed in PTL 1, a spring collar of a slightly larger outer diameter than the diameter of the shaft holes provided in the arms of the U-shaped links is fitted onto a small-diameter portion provided in the intermediate portion of the connection shaft. By providing a gap between the inner surface of the spring collar and the small-diameter portion, it is possible, in the chain connection link disclosed in PTL 1, to attach the spring collar through an easy operation.

In the chain connection link disclosed in PTL 2, the sectional configuration of a detachment prevention ring fixed to the intermediate portion of the connection shaft is elliptical; and the length of the minor axis thereof is smaller than the outer diameter of the connection shaft, and length of the major axis thereof is larger than the outer diameter of the connection shaft. Thus, in a state in which high load is being applied to U-shaped rods, even if a twisting action is applied between the U-shaped rods, it is possible to suppress plastic deformation beyond the elasticity limit of the detachment prevention ring. As a result, in the chain connection link disclosed in PTL 2, it is possible to suppress inadvertent detachment of the connection shaft.

In this way, the techniques adopted in the chain connection links disclosed in PTL 1 and PTL 2 relate to an improvement of a spring collar and a detachment prevention ring, and there exists as yet no technique related to an improvement in terms of the strength of a chain connection link taking into account the environment of use thereof.

CITATION LIST

Patent Literature

PTL 1: JP-B-63-35861
PTL 2: JP-UM-A-57-167937

SUMMARY OF INVENTION

Technical Problem

As a result of the advancement in metal materials, an increase in the strength of chains has been achieved, and a reduction in chain size has been realized. With this reduction in chain size, chain connection links for connecting chains have been reduced in size.

As described above, when connecting a chain by a chain connection link, connection arm portions of the chain connection link are inserted into the elliptical annular chain link to be connected, and then the chain connection links are connected together by a connection shaft. Thus, when the link forming the chain is reduced in size, the connection arm portions of the chain connection link must also be reduced in size; otherwise, the connection arm portions could not be inserted into the chain link. Thus, the connection arm portions of the chain connection link are also reduced in size, and the chain connection link as a whole is reduced in size.

However, in the conventional chain connection link, no examination has been made with regard to the securing of strength required as a result of the reduction in size, in particular, with regard to an improvement in terms of fatigue strength.

For example, a chain sling used for loading and unloading is used in various severe use environments such as construction sites and working sites. Thus, if, during use, the chain connection link comes into contact with or collides with the cargo, the sling metal member, a structure, an obstacle, etc. to suffer wear, deformation, and damage, deterioration in its strength is inevitable. A reduction in the strength of the chain connection link involves a reduction in the strength of the chain sling as a whole, so that, with the reduction in chain size, it is an urgent requirement to secure the strength of the chain connection link.

The present invention has been made in view of the above problem; it is an object of the present invention to provide a chain connection link which can suppress generation of deformation due to wear, damage or the like in the outer periphery of the connection arm portions and which can achieve an improvement in terms of the strength of the connection arm portions, in particular, in terms of the fatigue strength thereof.

Solution to Problem

To achieve the above object, the present invention provides a chain connection link including: a pair of U-shaped links of a U-shaped configuration in front view and each having two arms; a connection arm portion provided at an end portion of one arm of each of these U-shaped links; a connection groove-shaped arm portion having a groove and provided at an end portion of the other arm of each of these U-shaped links; and through-holes provided in the connection arm portion and the connection groove-shaped arm portion, the connection arm portion of one U-shaped link being fit-engaged with the connection groove-shaped arm portion of the other U-shaped link, a connection shaft being passed through the through-holes to connect the pair of U-shaped links, wherein the size of the outer periphery of the connection groove-shaped arm portion is larger than the size of the outer periphery of the connection arm portion.

In this chain connection link, the connection groove-shaped arm portion is preferably formed by an outer arm portion and an inner arm portion arranged with the groove therebetween; and the size of the outer periphery of one or both of the outer arm portion and the inner arm portion is larger than the size of the outer periphery of the connection arm portion.

Effects of Invention

In the chain connection link according to the present invention, it is possible to suppress generation of deformation due to wear, damage or the like in the outer periphery of the connection arm portions, making it possible to achieve an improvement in terms of the strength of the connection arm portions, in particular, in terms of the fatigue strength thereof.

DESCRIPTION OF EMBODIMENTS

Figure 1:
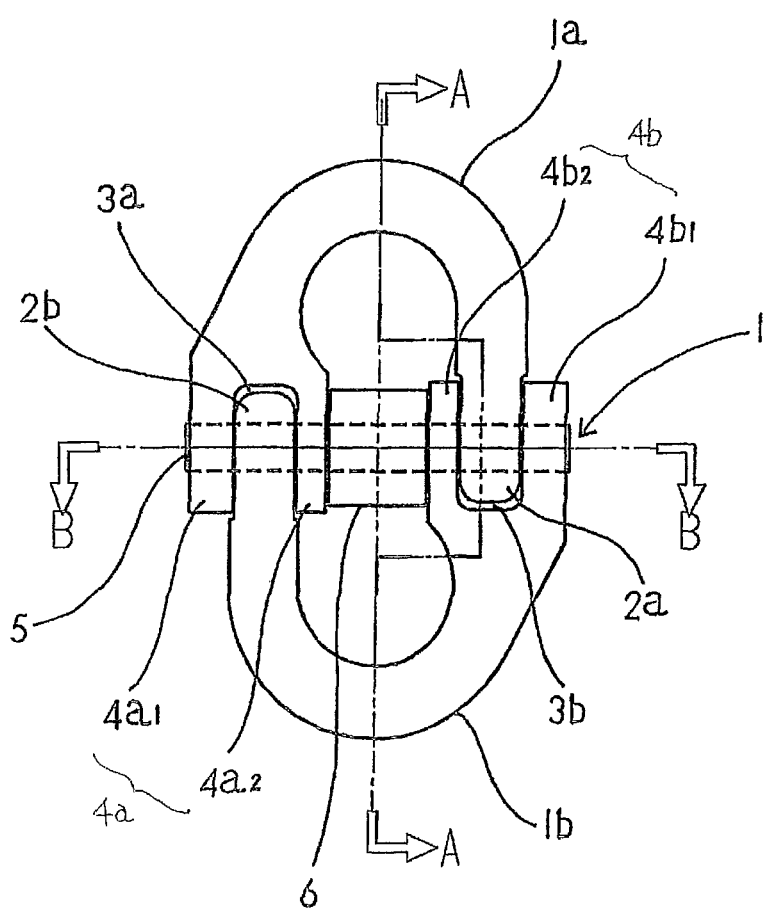
FIG. 1 is a front view of a chain connection link according to an embodiment of the present invention.
Figure 2:
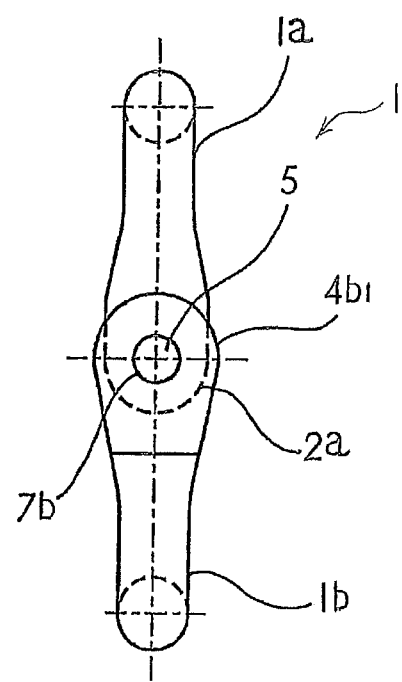
FIG. 2 is a right-hand side view of the chain connection link shown in FIG. 1.
Figure 3:
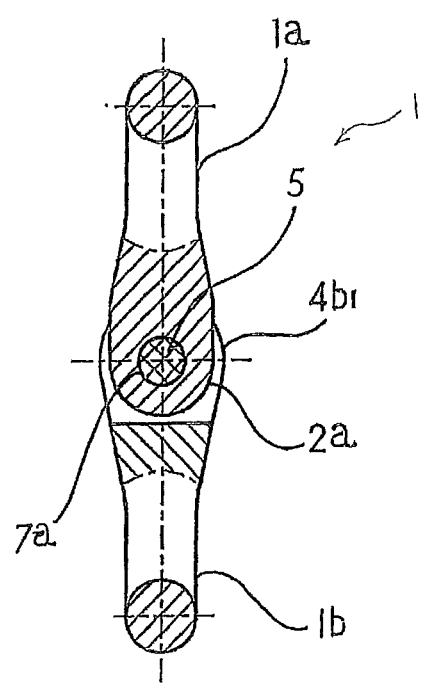
FIG. 3 is a sectional view, taken along the arrow line A-A, of the chain connection link shown in FIG. 1.
Figure 4:
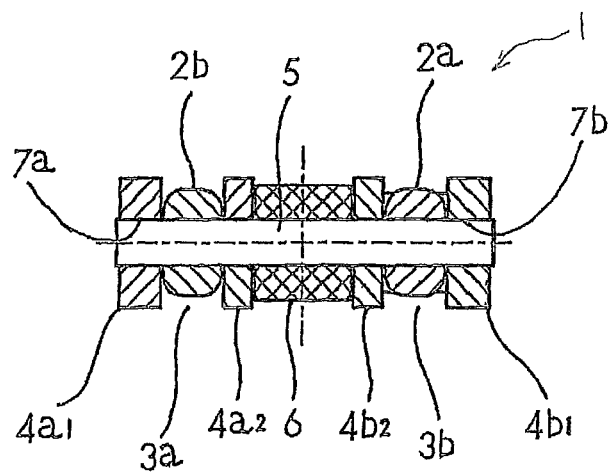
FIG. 4 is a sectional view, taken along the arrow line B-B, of the chain connection link shown in FIG. 1.
Figure 7A:
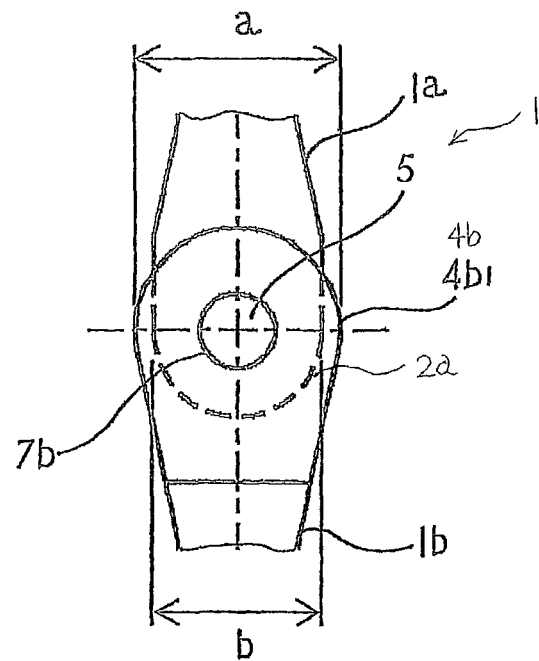
FIGS. 7(a) and 7(b) are partial enlarged views respectively corresponding to FIGS. 2 and 4.
Figure 7B:
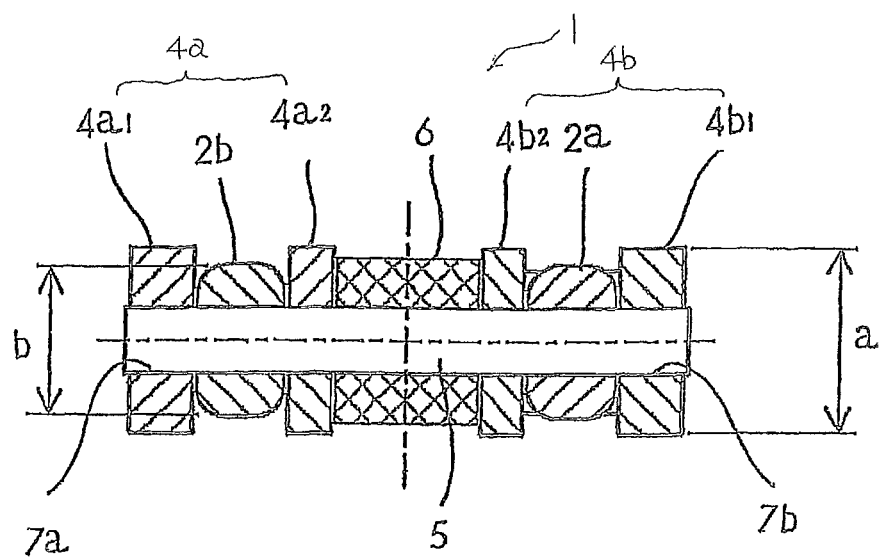

FIG. 1 is a front view of a chain connection link according to an embodiment of the present invention. FIG. 2 is a right-hand side view of the chain connection link shown in FIG. 1. FIG. 3 is a sectional view, taken along the arrow line A-A, of the chain connection link shown in FIG. 1. FIG. 4 is a sectional view, taken along the arrow line B-B, of the chain connection link shown in FIG. 1. FIGS. 7(a) and 7(b) are partial enlarged views respectively corresponding to FIGS. 2 and 4.

In FIGS. 1 through 4, numeral 1 indicates a chain connection link, which is composed of a pair of U-shaped links 1a and 1b of a U-shaped configuration in front view. Each of the U-shaped links 1a and 1b has two arms. In the U-shaped link 1a, 1b, at one arm end portion, there is provided a connection arm portion 2a, 2b; at the other arm end portion, there is formed a groove 3a, 3b; and connection groove arm portions 4a, 4b of a U-shaped configuration in front view are formed. The connection groove-shaped arm portion 4a is formed by an outer arm portion $4a_1$ and an inner arm portion $4a_2$. Similarly, the connection groove-shaped arm portion 4b is formed by an outer arm portion $4b_1$ and an inner arm portion $4b_2$. When assembling the chain connection link 1, the connection arm portion 2b is fit-engaged with the connection groove-shaped arm portion 4a, and the connection groove portion 2a is fit-engaged with the connection groove-shaped arm portion 4b. Numeral 5 indicates a connection shaft, and numeral 6 indicates a collar. Numeral 7a indicates a through-hole extending through the connection arm portion 2a and the outer arm portion $4b_1$ and the inner arm portion $4b_2$ of the connection groove-shaped arm portion 4b. Numeral 7b indicates a through-hole extending through the connection arm portion 2b and the outer arm portion $4a_1$ and the inner arm portion $4a_2$ of the connection groove-shaped arm portion 4a. As shown in FIGS. 7(a) and 7(b), in the outer periphery of the connection groove arm portions 4a and 4b, the outer diameter a corresponding to the inner diameter direction of the through-holes 7a and 7b is larger than the outer diameter b corresponding to the inner diameter direction of the through-holes 7a and 7b in the outer periphery of the connection arm portions 2a and 2b.

When assembling the chain connection link 1 by connecting this pair of U-shaped links 1a and 1b, the connection arm portion 2a of the U-shaped link 1a is fit-engaged with the groove 3b of the connection groove-shaped arm portion 4b of the U-shaped link 1b, and the connection arm portion 2b of the U-shaped link 1b is fit-engaged with the connection groove-shaped arm portion 4a of the U-shaped link 1a. Next, the collar 6 provided with a detachment prevention means (not shown) for the connection shaft 5 is attached between the inner arm portion $4a_2$ of the connection groove-shaped arm portion 4a and the inner arm portion $4b_2$ of the connection groove-shaped arm portion 4b. After this, the through-holes 7a and 7b are matched with each other, and the connection shaft 5 is passed therethrough. In this way, the pair of U-shaped links 1a and 1b are connected, whereby the chain connection link 1 is assembled.

In the chain connection link 1, in the pair of U-shaped links 1a and 1b, the outer diameter a of the outer periphery of the connection groove-shaped arm portion 4a and 4b is larger than the outer diameter b of the connection arm portions 2a and 2b. Thus, the outer peripheral portions of the connection groove-shaped arm portions 4a and 4b protrude beyond the outer edges of the outer peripheral portions of the connection arm portions 2a and 2b. Thus, the connection arm portions 2a and 2b of the U-shaped links 1a and 1b do not easily come into contact with or collide with the suspended cargo and other metal members, and, further, a structure, an obstacle and the like. Even when the connection groove-shaped arm portions 4a and 4b of the chain connection link 1 come into contact with or collide with the cargo, etc., it is possible for the connection arm portions 2a and 2b to avoid coming into contact with or colliding with the cargo, etc., making it possible to suppress generation of deformation such as wear, damage, dent, or the like of the connection arm portions 2a and 2b. Further, by making the outer diameter a in the outer periphery of the connection groove-shaped arm portions 4a and 4b larger than the outer periphery b in the outer periphery of the connection arm portions 2a and 2b, it is possible to enhance the strength of the U-shaped links 1a and 1b. Thus, it is possible to achieve an improvement in terms of strength along with the reduction in the size of the chain connection link 1. Further, the outer diameter b of the outer periphery of the connection arm portions 2a and 2b can serve as a guide for the wear limit of the connection groove-shaped arm portions 4a and 4b, whereby it is possible to facilitate the maintenance and control at the working site, etc.

As shown in FIGS. 7(a) and 7(b), in the chain connection link 1, the outer diameter of the collar 6 can be larger than the outer diameter b of the connection arm portions 2a and 2b, and smaller than the outer diameter a of the connection groove-shaped arm portions 4a and 4b. Further, in the connection groove-shaped arm portions 4a and 4b, the outer diameter of the outer periphery of the outer arm portions $4a_1$ and $4b_1$ can be made equal to the outer diameter of the outer periphery of the inner arm portions $4a_2$ and $4b_2$, and, on the other hand, the thickness of the outer arm portions $4a_1$ and $4b_1$ in the direction in which the through-holes 7a and 7b extend can be larger than the thickness of the inner arm portions $4a_2$ and $4b_2$ in the direction in which the through-holes 7a and 7b extend. Further, the thickness of the connection arm portions 2a and 2b in the direction in which the through-holes 7a and 7b extend can be made larger than the thickness of the outer arm portions $4a_1$ and $4b_1$ in the direction in which the through-holes 7a and 7b extend.

Figure 5:
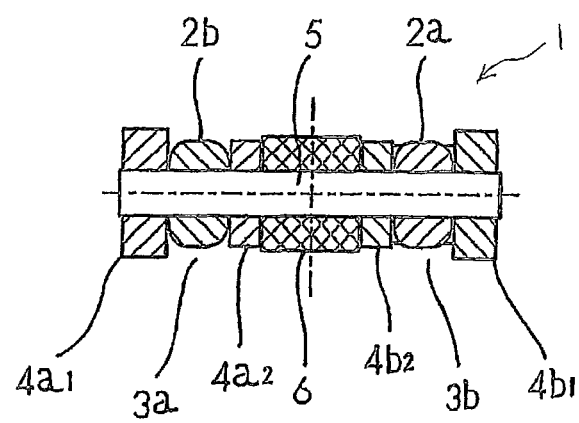
FIG. 5 is a sectional view, corresponding to FIG. 4, of a chain connection link according to an embodiment of the present invention as seen in the direction of the arrows.

FIG. 5 is a sectional view, taken along the arrow line of FIG. 4, illustrating a chain connection link according to an embodiment of the present invention. Regarding this embodiment, the components that are the same as those of the embodiment shown in FIGS. 1 through 4 are indicated by the same reference numerals in FIG. 5, and a description thereof will be left out.

In the chain connection link 1 shown in FIG. 5, in the connection groove-shaped arm portions 4a and 4b, the outer diameter of the outer arm portions $4a_1$ and $4b_1$ in the outer periphery is larger than the outer diameter of the connection arm portions 2a and 2b, and larger than the outer diameter of the inner arm portions $4a_2$ and $4b_2$ in the outer periphery.

Figure 6:
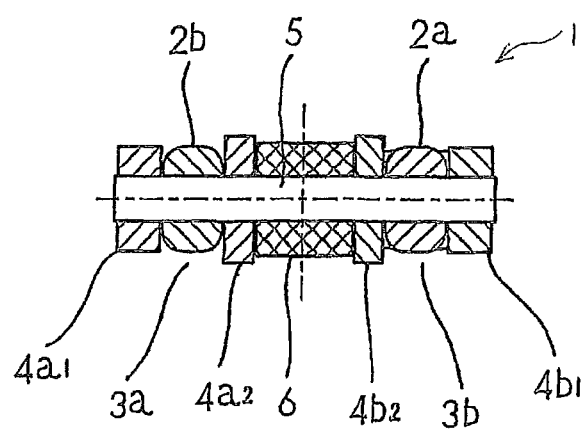
FIG. 6 is a sectional view, corresponding to FIG. 4, of a chain connection link according to an embodiment of the present invention as seen in the direction of the arrows.

FIG. 6 is a sectional view, taken along the arrow line of FIG. 4, illustrating a chain connection link according to an embodiment of the present invention. Regarding this embodiment, the components that are the same as those of the embodiment shown in FIGS. 1 through 4 are indicated by the same reference numerals in FIG. 5, and a description thereof will be left out.

In the chain connection link 1 shown in FIG. 6, in the connection groove-shaped arm portions 4a and 4b, the outer diameter of the inner arm portions $4a_2$ and $4b_2$ in the outer periphery is larger than the outer diameter of the connection arm portions 2a and 2b, and larger than the outer diameter of the outer arm portions $4a_1$ and $4b_1$ in the outer periphery.

REFERENCE SIGNS LIST 1 chain connection link
1a, 1b U-shaped link
2a, 2b connection arm portion
3a, 3b groove
4a, 4b connection groove-shaped arm portion
$4a_1$ outer arm portion
$4a_2$ inner arm portion
5 connection shaft
7a, 7b through-hole Industrial Applicability In the chain connection link according to the present invention, an improvement is achieved in terms of securing strength, in particular, fatigue strength, along with a reduction in size.

The invention claimed is:

1. A chain connection link comprising:
a pair of U-shaped links of a U-shaped configuration in a front view, each of the U-shaped links having a first arm and a second arm, the first arm being disposed at a first side of each of the U-shaped links, and the second arm being disposed at a second side of each of the U-shaped links;
a first connection arm portion provided at an end portion of the first arm of a first one of the U-shaped links, and a second connection arm portion provided at an end portion of the first arm of a second one of the pair of U-shaped links;
a first connection groove-shaped arm portion provided at an end portion of the second arm of the first one of the U-shaped links, and a second connection groove-shaped arm portion provided at an end portion of the second arm of the second one of the pair of U-shaped links; and
through-holes provided for passing a connection shaft in the first and second connection arm portions and the first and second connection groove-shaped arm portions,
wherein the first connection groove-shaped arm portion has a first groove, and the second connection groove-shaped arm portion has a second groove,
wherein the first connection groove-shaped arm portion is formed by a first outer arm portion and a first inner arm portion, the first outer arm portion being disposed on a first side of the first groove, and the first inner arm portion being disposed on a second side of the first groove,
wherein the second connection groove-shaped arm portion is formed by a second outer arm portion and a second inner arm portion, the second outer arm portion being disposed on a first side of the second groove, and the second inner arm portion being disposed on a second side of the second groove,
wherein the first connection arm portion is fit-engaged with the second connection groove-shaped arm portion, the connection shaft being passed through the through-holes to connect the pair of U-shaped links,
wherein an outer diameter of each of the first and second connection groove-shaped arm portions is larger than an outer diameter of each of the first and second connection arm portions such that the first and second connection arm portions do not come into contact with or collide with a suspended cargo, and
wherein a relationship among (i) a thickness of each of the first and second outer arm portions, (ii) a thickness of each of the first and second inner arm portions, and (iii) a thickness of each of the first and second connection arm portions in a direction in which the through-holes extend is as follows:
the thickness of each of the first and second connection arm portions>the thickness of each of the first and second outer arm portions>the thickness of each of the first and second inner arm portions.

2. The chain connection link according to claim 1,
wherein a collar is provided between the first connection groove-shaped arm portion and the second connection groove-shaped arm portion, and
wherein an outer diameter of the collar is constant along the connection shaft.

* * * * *